United States Patent

Sakuma

[11] Patent Number: 5,940,405
[45] Date of Patent: Aug. 17, 1999

[54] HIGH-SPEED TWO-WAY MULTIPLEX DATA COMMUNICATION SYSTEM AND DATA COMMUNICATION DEVICE USED THEREIN

[75] Inventor: Shigeru Sakuma, Tokyo, Japan

[73] Assignee: NEC Corporation, Japan

[21] Appl. No.: 08/728,855

[22] Filed: Oct. 10, 1996

[30] Foreign Application Priority Data

Oct. 16, 1995 [JP] Japan .................................. 7-267172

[51] Int. Cl.⁶ .............................. H04J 3/16; H04J 3/17
[52] U.S. Cl. ............................................ 370/468; 370/435
[58] Field of Search ..................................... 370/252, 253, 370/254, 389, 537, 535, 493, 522, 433, 435, 465, 468, 352, 353, 346, 474, 449

[56] References Cited

U.S. PATENT DOCUMENTS 3,311,704 3/1967 Filipowsky et al. ..................... 370/537
5,740,542 4/1998 Leeper et al. ............................ 370/493

FOREIGN PATENT DOCUMENTS

3-6705 1/1991 Japan .

*Primary Examiner*—Michael Horabik
*Assistant Examiner*—Kevin C. Harper
*Attorney, Agent, or Firm*—Ostrolenk, Faber, Gerb & Soffen, LLP

[57] ABSTRACT

A two-way multiplex data communication system transmits a multiple signal representative of a piece of user's data information, a piece of communication controlling data information or a piece of voice data information, and gives the top priority to the piece of communication controlling data information so that a data receiving terminal immediately acknowledges a reception of the multiple signal representative of the piece of user's data information to a transmitting terminal, thereby accelerating the data transfer.

9 Claims, 7 Drawing Sheets

HIGH-SPEED TWO-WAY MULTIPLEX DATA COMMUNICATION SYSTEM AND DATA COMMUNICATION DEVICE USED THEREIN

FIELD OF THE INVENTION

This invention relates to a two-way multiplex data communication system and, more particularly, to a two-way multiplex data communication system and a data communication device used therein for transmitting user data information at high speed.

DESCRIPTION OF THE RELATED ART

While a person is speaking to another one on the telephone, the voice data intermittently flow through a telephone communication path, and silent periods take place between the voice data. It is said that the total silent period is a half of the telephone communication. The silent period is available for data communication. A two-way multiplex data communication system discriminates the silent period from a voice signal, and multiplexes data communication controlling data with the voice signal in the silent period so as to transmit them through the telephone communication path.

Figure 1:
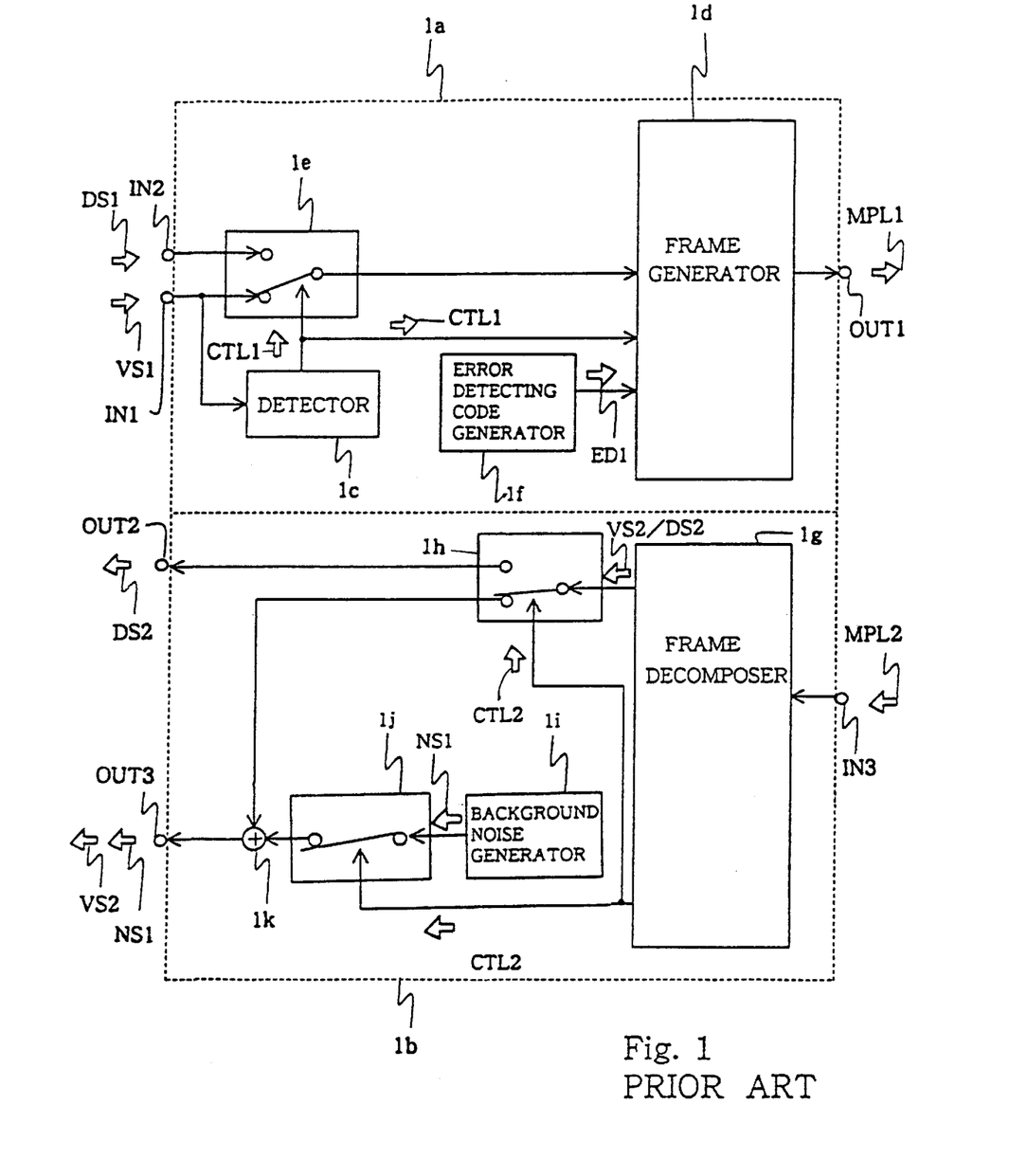
FIG. 1 is a block diagram showing the circuit arrangement of the prior art two-way data communication device.

FIG. 1 illustrates a typical example of a communication device forming a part of the two-way multiplex data communication system for data communication and telephone communication. The prior art communication device is broken down into a transmitting block 1a and a receiving block 1b. The transmitting block 1a multiplexes a data signal DS1 with a voice signal VS1, and transmits a multiple signal MPL1 to another communication device. On the other hand, a multiple signal MPL2 is supplied from another communication device to the receiving block 1b, and the receiving block 1b separates the multiple signal MPL2 into a voice signal VS2 and a data signal DS2.

Two input terminals IN1/IN2 and an output terminal OUT1 are provided for the transmitting block 1a, and are assigned to the voice signal VS1, the data signal DS1 and the multiple signal MPL1, respectively. The transmitting block 1a includes a detector 1c connected to the input terminal IN1, a frame generator 1d connected to the output terminal OUT1, a switching circuit 1e connected between the input terminals IN1/IN2 and the frame generator 1d and an error detecting code generator 1f associated with the frame generator 1d. The detector 1c monitors the input node IN1 to see whether or not the voice signal VS1 is representative of silent status, and changes a control signal CTL1. When the voice signal VS is representing a talk period, the detector 1c supplies the control signal CTL1 representative of the input terminal IN1 to the switching circuit 1e, and the switching circuit 1e transfers the voice signal VS1 to the frame generator 1d. On the other hand, when the detector 1c notices the voice signal VS1 represents a silent period, the detector 1c changes the control signal CTL1 so as to connect the input terminal IN2 to the frame generator 1d, and the switching circuit 1e multiplexes the data signal DS1 with the silent voice signal VS1.

Figure 2:
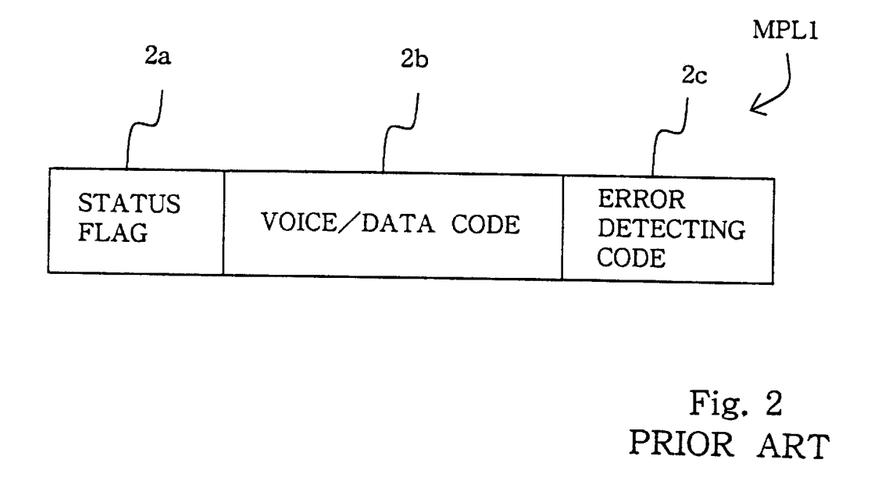
FIG. 2 is a view showing the format of the multiple signal used in the prior art data communication devices.

The control signal CTL1 is further supplied to the frame generator 1d, and the error detecting code generator 1f supplies an error detecting signal ED1 to the frame generator 1d. The frame generator 1d formats a piece of status information represented by the control signal CTL1, a piece of voice/data information represented by the voice/data signal VS1/DS1 and a piece of error detecting information represented by the error detecting signal ED1 into the multiple signal MPL1 as shown in FIG. 2. The frame generator 1d generates a status flag 2a, a voice/data code 2b and an error detecting code 2c from the control signal CTL1, the voice/data signal VS1/DS1 and the error detecting signal ED1, and supplies the multiple signal MPL1 from the output terminal OUT1 through the telephone communication path to another communication device.

On the other hand, the receiving block 1b includes a frame decomposer 1g connected to an input terminal IN3, a switching circuit 1h connected to the frame decomposer 1g, a background noise generator 1i, a switching circuit 1j connected to the background noise generator 1i and a mixer 1k connected to the switching circuits 1h/1j. The receiving block 1b has two output terminals OUT2/OUT3 respectively coupled to the switching circuit 1h and the mixer 1k, and are assigned to the data signal DS2 and the voice signal VS2, respectively.

When a multiple signal MPL2 is supplied from another communication device to the input terminal IN3, the frame decomposer 1g separates the multiple signal MPL2 into a voice/data code and a status flag, and generates a voice/data signal VS2/DS2 and a control signal CTL2 from the voice/data code and the status flag. The voice/data signal VS2/DS2 is supplied to the input node of the switching circuit 1h, and the control signal CTL2 is supplied to the control nodes of the switching circuits 1h and 1j.

The switching circuit 1h is responsive to the control signal CTL2 representative of the silent status for transferring the data signal DS2 to the output node OUT2. On the other hand, when the control signal CTL2 is representative of a talk period, the switching circuit 1h transfers the voice signal VS2 to the mixer 1k. The voice signal VS2 passes through the mixer 1k, and is transferred to the output terminal OUT3.

While a series of multiple signals MPL2 is representing the silent status, the switching circuit 1h successively transfers the data signals DS2 to the output node OUT2, and no voice signal is supplied to the output terminal OUT3. If a telephone receiver reproduces only the voice signal VS2, the telephone receiver loses all sound during the transmission of the data signals DS2 to the output terminal OUT2, and the listener's reaction is that such a perfect silence is curious. For this reason, the background noise generator 1i generates a noise signal NS1 representative of a background noise such as a dummy noise or a Gaussian noise, and the switching circuit 1j transfers the noise signal NS1 to the mixer 1k in response to the control signal CTL2 representative of the silent status. The mixer 1k supplies the noise signal NS1 to the telephone receiver in the absence of the voice signal VS2, and causes the telephone receiver to reproduce the background noise.

The prior art two-way multiplex data communication system behaves as follows. First, a receiving station is identified, and a line of contact is established between the communication devices. Thereafter, the communication device on the transmitting side sends a data-link request to the communication device on the receiving side. If the data link request is acceptable, the communication device on the receiving side answers the request, and the data link is established between the communication device.

Then, the prior art two-way multiplex data communication system enters into an information transmitting phase upon establishment of the data link, and the communication device on the transmitting side can multiplex the data signal with the voice signal in the silent periods. When the other data communication device receives the multiple signal, the data communication device acknowledges the reception of the multiple signal, and the data communication devices repeat the above described procedure until the data transfer is completed.

The acknowledgement contains the status flag representative of the silent status and controlling data bits representative of the reception of the multiple signal, and the format for the acknowledgement is identical with that shown in FIG. 2. The communication device on the receiving side sends the acknowledgement as a kind of multiple signal MPL1.

In detail, when the data signal DS2 is supplied from the frame decomposer 1g through the switching circuit 1h to the output terminal OUT2, a detector (not shown) generates the controlling data bits, and supplies the data signal DS1 representative of the controlling data bits to the switching circuit 1e. While the voice signal VS1 is representative of the silence, the data signal DS1 representative of the controlling data bits is transferred to the frame generator 1d, and the frame generator 1d forms the multiple signal MPL1 representative of the acknowledgement. The communication device sends the multiple signal MPL1 representative of the acknowledgement to the communication device on the transmitting side.

When all the data information is transferred, the communication device on the transmitting side sends a request for cancellation of the data link to the communication device on the receiving side. The data communication of the receiving side acknowledges the request, and the data communication is terminated upon reception of the acknowledgement. Thus, the prior art two-way multiplex data communication system transfers the data information from the communication device on the transmitting side to the communication device on the receiving side during the silent period.

However, the data information is continuously transferred between the communication devices only when the silent status is concurrently established therein. Even if the person on the data transmitting side does not speak, the communication device on the transmitting side interrupts the transmission of the data information in so far as the person on the receiving side speaks. This is because of the fact that the data communication device can not acknowledge the reception of the multiple signal. The communication device on the transmitting side does not send a new piece of data information without the acknowledgement, and, for this reason, the prior art two-way multiplex data communication system encounters a problem in low data transmission rate.

SUMMARY OF THE INVENTION

It is therefore an important object of the present invention to provide a two-way multiplex data communication system which continues data transmission even when a person speaks on a data receiving side.

It is also an important object of the present invention to provide a communication device which is available for the two-way multiplex data communication system.

To accomplish the object, the present invention proposes to insert an informative code representative of whether a data code represents controlling data information or user's data information into a multiple signal.

In accordance with one aspect of the present invention, there is provided a two-way multiplex data communication system for transmitting pieces of voice data information, pieces of user's data information and pieces of control data information between at least two communication terminals, one of the at least two communication terminals comprises a first source of voice data information for intermittently generating first pieces of voice data information, a source of user's data information for generating a piece of user's data information when the source of user's data information receives a first piece of control data information representative of a receipt of a previous piece of user's data information, a detecting means discriminating the first pieces of voice data information from silent status and generating a second piece of control data information representative of the silent status, a first transmitting means for transmitting the first pieces of voice data information to the other of the at least two communication terminals in the absence of the second piece of control data information and the piece of user's data information to the other of the at least two communication terminals in the presence of the second piece of control data information and a first reproducing means for reproducing a first voice from second pieces of voice data information, and the other of the at least two communication terminals comprises a second source of voice data information for intermittently generating the second pieces of voice data information, a second reproducing means for reproducing a second voice from the first pieces of voice data information, a destination of user's data information for receiving the piece of user's data information and the previous piece of user's data information, a source of control data information for generating the first piece of control data information when the destination receives the previous piece of user's data information, and a second transmitting means for preferentially transmitting the first piece of control data information to the aforesaid one of the at least two communication terminals, the second transmitting means transmitting the second pieces of voice data information in the absence of the first piece of control data information.

In accordance with another aspect of the present invention, there is provided a data communication device used in a two-way multiple data communication system, comprising: a transmitting block including a first input node supplied with a first voice signal representative of a piece of voice data information and a silence, a second input node supplied with a first data signal representative of a piece of user's data information or a piece of control data information, a third input node supplied with a first control signal representing that the first data signal represents one of the piece of user's data information and the piece of the control data information, a detecting means monitoring the first input node for generating a second control signal when the first voice signal is representative of the piece of voice data information, a first switching means having a fourth input node connected to the first input node and a fifth input node connected to the second input node and transferring the voice signal to a first output node thereof in the presence of the second control signal representative of the piece of voice data information and the data signal to the first output node in the absence of the second control signal, a second switching means having a sixth input node connected to the second input node and a seventh input node connected to the first output node and responsive to the first control signal for transferring the voice signal and the data signal to a second output node thereof when the first control signal is representative of the piece of user's data information, the second switching means transferring the data signal representative of the piece of control data information to the second output node when the first control signal is representative of the piece of control data information, and a transmitting means connected at input nodes thereof to the third input node, the first and second output nodes and the detecting means and at an output node thereof to an external device and transmitting a multiple signal produced from the voice signal, the data signal and the first and second control signals to the external device.

BRIEF DESCRIPTION OF THE DRAWINGS

The features and advantages of the two-way multiplex data communication system and the communication device according to the present invention will be more clearly understood from the following description taken in conjunction with the accompanying drawings in which.

DESCRIPTION OF THE PREFERRED EMBODIMENT

Figure 3:
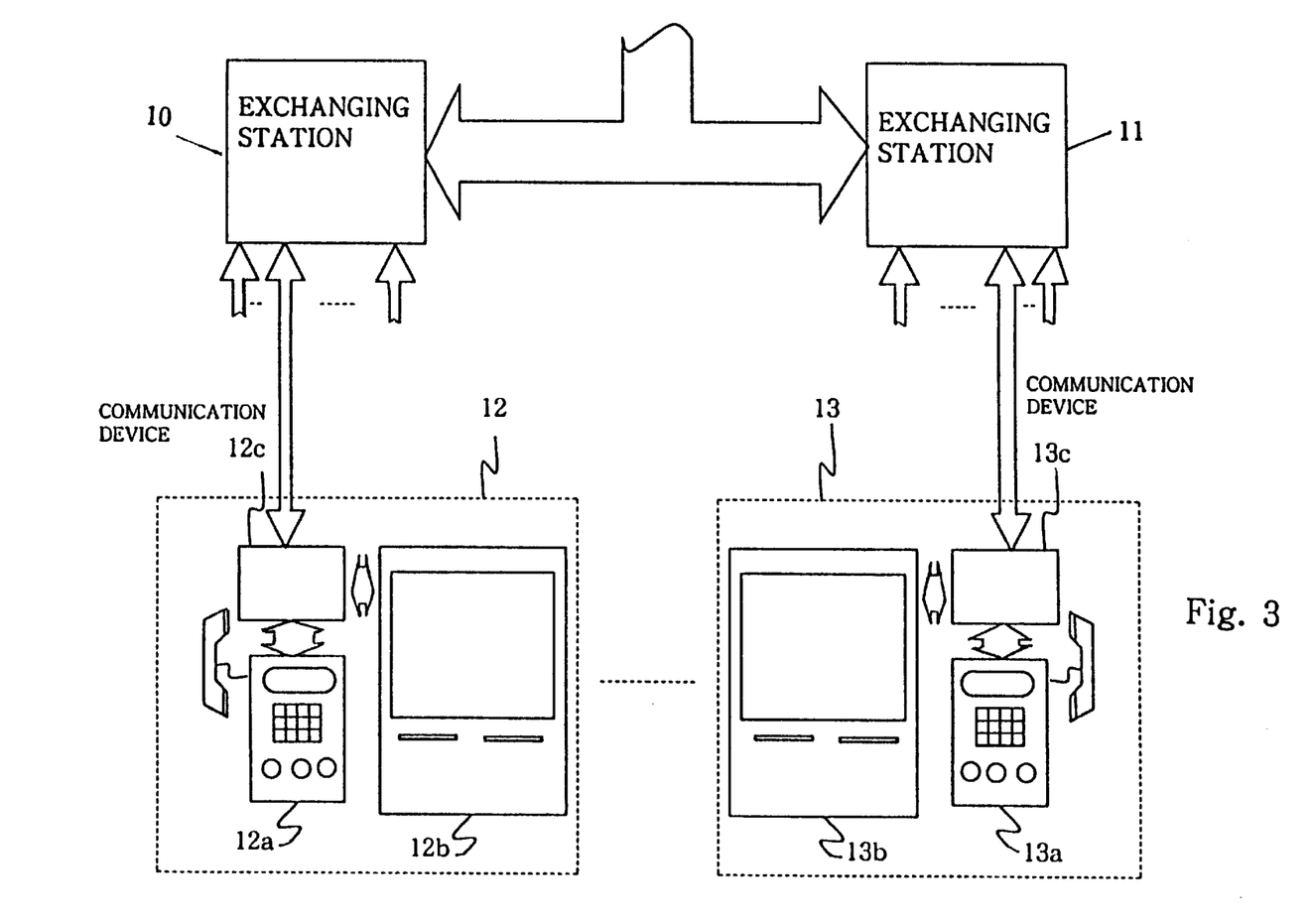
FIG. 3 is a schematic view showing a two-way multiplex data communication system according to the present invention.

Referring to FIG. 3 of the drawings, a two-way multiplex data communication system embodying the present invention comprises a plurality of exchanging stations 10 and 11 communicable with one another and a plurality of communication terminals 12 and 13 connectable to associated exchanging stations 10 and 11. In this instance, communication terminal 12 is connectable to the exchanging station 12, and communication terminal 13 is connectable to the other exchanging station 11. When a subscriber at communication terminal 12 communicates with another subscriber at communication terminal 13, a two-way channel is established between the communication terminals 12 and 13 through the exchanging stations 12 and 11. In this instance, a telephone set 12a, a data processing apparatus 12b such as, for example, a personal computer and a communication device 12c in combination form the communication terminal 12, and a telephone set 13a, a data processing apparatus 13b and a communication device 13c are also incorporated in the other communication terminal 13. The telephone sets 12a/13a and the data processing apparatus 12b/13b are well known to a person skilled in the art, and no further description is incorporated hereinbelow. The communication devices 12c and 13c are similar in circuit arrangement to one another, and description is hereinbelow made on the communication device 12c only.

Figure 4:
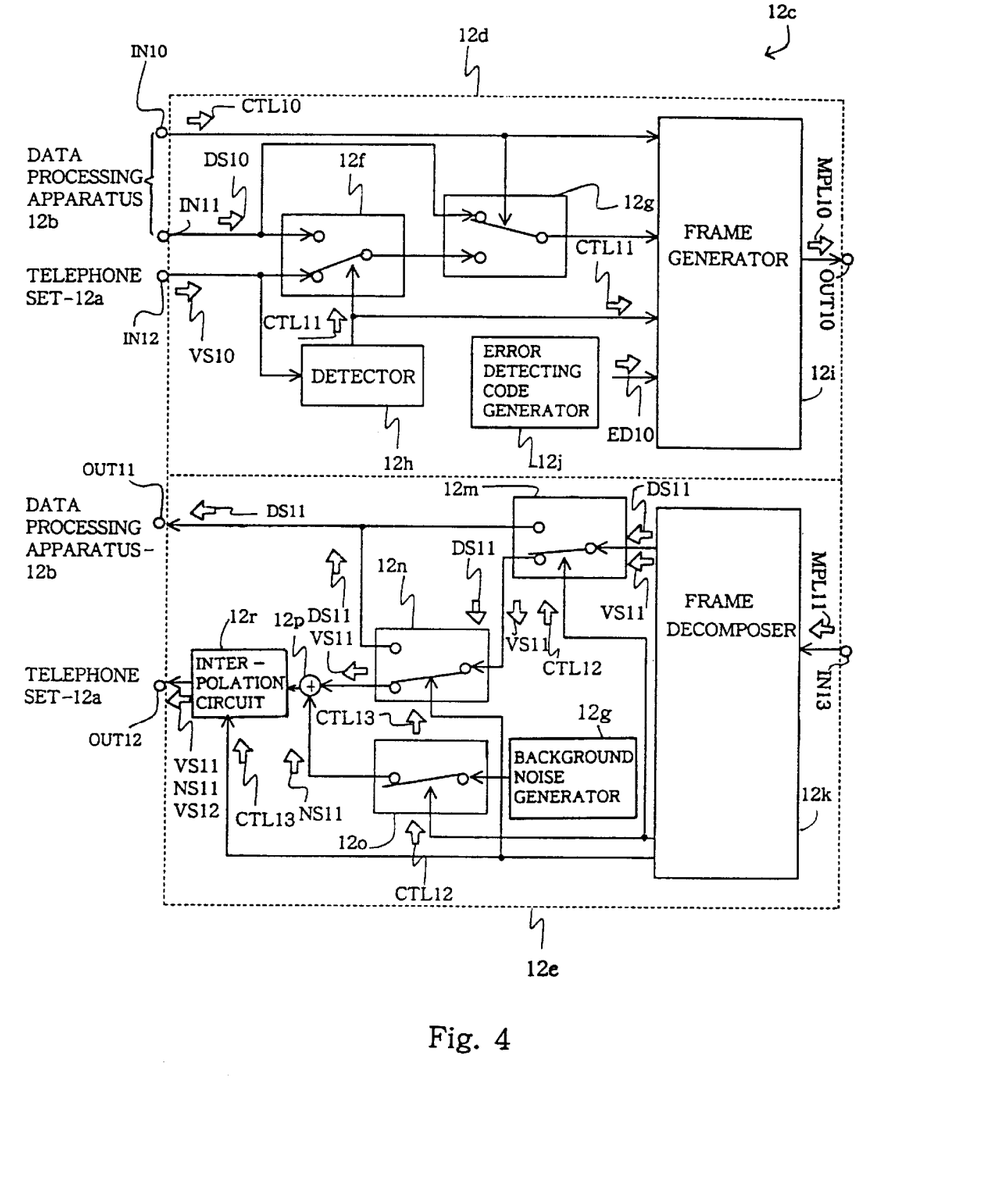
FIG. 4 is a block diagram showing the circuit arrangement of a communication device of the multiplex data communication system according to the present invention.

Turning to FIG. 4 of the drawings, the communication device 12c is broken down into a transmitting block 12d and a receiving block 12e. The transmitting block 12d has input terminal IN10, IN11 and IN12, and the input terminals IN10/IN11 and the input terminal IN12 are respectively connected to the data processing apparatus 12b and the telephone set 12a. The transmitting block 12d further has an output terminal OUT10 connected through a channel to the exchanging station 10. On the other hand, the receiving block 12e has an input terminal IN13 connected through the channel to the exchanging station 10 and output terminals OUT11 and OUT12 respectively connected to the data processing apparatus 12b and the telephone set 12a.

A data signal DS10 is representative of user's data information or control data information such as an acknowledgement of a multiple signal, and is supplied from the data processing apparatus 12b to the input terminal IN11. The input terminal IN10 is assigned to a control signal CTL10 representative of the kind of data information, i.e., one of the user data information and the control data information, and a voice signal VS10 representative of a piece of talk is supplied from the telephone set 12a to the input terminal IN12.

The transmitting block 12d includes two switching circuits 12f and 12g and a detector 12h. The switching circuit 12f has two input nodes respectively connected to the input terminals IN10 and IN11 and a control node connected to the detector 12h. The detector 12h monitors the input terminal IN12 to see whether the voice signal represents the part of talk or silence While the voice signal VS10 is represents talking, the detector 12h supplies a control signal CTL11 representative of a part of talk to the switching circuit 12f. The switching circuit 12f is responsive to the control signal CTL11 for transferring the voice signal VS10 to the switching circuit 12g. On the other hand, when the voice signal VS10 represents the silence, the detector changes the control signal CLT11, and causes the switching circuit 12f to transfer the data signal DS10 to the switching circuit 12g. Thus, the switching circuit 12f multiplexes the data signal DS10 with the voice signal VS10.

The other switching circuit 12g has a control node connected to the input terminal IN10 and two input nodes connected to the output node of the switching circuit 12f and the input terminal IN11. The switching circuit 12g is responsive to the control signal CTL10 representative of user's data information for passing the data/voice signal DS10/VS10 therethrough. When the control signal CTL10 is changed to the control data information, the signal path connects the other input node to the output node so as to transfer the data signal DS10 to the output node thereof. Thus, the switching circuit 12g prioritizes the data signal DS10 representative of the control data information.

The transmitting block 12d further includes a frame generator 12i and an error detecting code generator 12j. The frame generator has four input nodes assigned to the control signal CTL10, the data/voice signal DS10/VS10, the control signal CTL11 and an error detecting signal ED10 representative of an error detecting code, and the frame generator 12i forms a multiple signal MPL10. The multiple signal MPL10 is supplied from the output node thereof to the output terminal OUT10.

Figure 5:
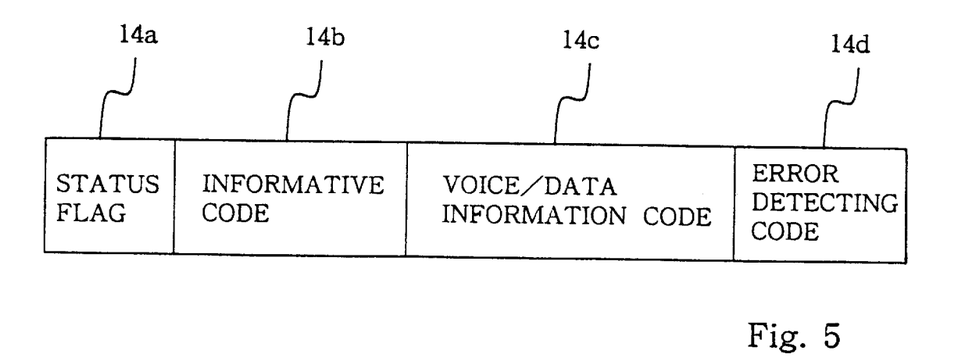
FIG. 5 is a view showing the format of the multiple signal used in the communication device.

FIG. 5 illustrates a format for the multiple signal MPL10. The format is divided into four sections 14a, 14b, 14c and 14d. These four sections 14a to 14d are respectively assigned to a status flag, an informative code, the voice/data information code and the error detecting code, respectively.

The status flag is representative of the silence or the talk, and the frame generator 12i produces the status flag from the control signal CTL11. On the other hand, informative code is representative of a kind of data information represented by the data signal DS10, i.e., a piece of user's data information or a piece of control data information, and the frame generator 12i produces the informative code from the control signal CTL10. The voice/data information code represents the piece of user's data information, the piece of control data information or a part of talk, and the frame generator 12i produces the voice/data information code from the data/voice signal DS10/VS10. Finally, the error detecting code is used for detecting and correcting error bits undesirably introduced into the multiple signal MPL10, and the frame generator 12i produces the error detecting code from the error detecting signal ED10.

The receiving block 12e has an input terminal IN13 and two output terminals OUT11 and OUT12. The input terminal 12k is connected to the exchanging station 10, and a series of multiple signals MPL11 is supplied from another communication device such as the communication device 13 through the channel to the input terminal IN13. Each of the multiple signals MPL11 is separated into a data signal DS11 representative of a piece of user's data information or a piece of controlling information such as an acknowledgement of the multiple signal MPL10 and a voice signal VS11 representative of a part of talk. The output terminal OUT11 is connected to the data processing apparatus 12b, and the data signal DS11 is supplied from the output terminal OUT to the data processing apparatus 12b. On the other hand, the output terminal OUT12 is connected to the telephone set 12a, and the voice signal VS11 is supplied from the output terminal OUT12 to the telephone set 12a.

The receiving block 12e includes a frame decomposer 12k, three switching circuits 12m, 12n and 12o and a mixer 12p. The multiple signal MPL11 is also formatted as shown in FIG. 5, and is separated into the status flag 14a, the informative code 14b, the voice/data information code 14c and the error detecting code 14d. The error detecting code is used for detecting and correcting error bits introduced into the voice/data information code 14c. The frame decomposer 12k produces the data/voice signal DS11/VS11, a control signal CTL12 and another control signal CTL13 from the voice/data information code 14c, the status flag 14a and the informative code 14b, respectively. For this reason, the control signal CTL12 is representative of either silence or talk, and the control signal CTL13 specifies the kind of data information, i.e., either user's data or controlling data information.

The switching circuit 12m is connected to one of the output nodes of the frame decomposer 12k, and the data/voice signals DS11/VS11 are supplied to the switching circuit 12m. The control signal CTL12 is supplied from another output node of the frame decomposer 12k to the control node of the switching circuit 12m. The switching circuit 12m is responsive to the control signal CTL12 so as to steer the data/voice signals DS11/VS11 between the output terminal OUT11 and the switching circuit 12n. When the control signal CTL12 is representative of the silence, the frame decomposer 12k supplies the data signal DS11 representative of user's data information to the switching circuit 12m, and the switching circuit 12m transfers the data signal DS11 to the output terminal OUT11. On the other hand, when the control signal CTL12 represents talking, the frame decomposer 12k supplies one of the data signal DS11 representative of the control data information or the voice signal VS11 to the switching circuit 12m, and the switching circuit 12m transfers the data signal DS11 or the voice signal VS11 to the switching circuit 12n for a further selection.

The switching circuit 12n is responsive to the other control signal CTL13 representative of the kind of data information, and steers the data signal DS11 representative of the control data information to the output node OUT11 and the voice signal VS11 to the mixer 12p.

In detail, even if the subscriber of the communication terminal 13 is under talking, the transmitting block 12d of the communication device 13 can transfer the control data information to the receiving block 12e of the communication device 12c together with the informative information indicating the control data information. In this situation, the data signal DS11 representative of the control data information is steered to the switching circuit 12n; however, the control signal CTL13 causes the switching circuit 12n to steer the data signal DS11 to the output terminal OUT11. On the other hand, when the informative information does not indicate the data signal DS11 to be the control data information, the voice signal VS11 is supplied to the switching circuit 12n, and the switching circuit 12n transfers the voice signal VS11 to the mixer 12p.

The receiving block 12e further includes a background noise generator 12q connected through the switching circuit 12o to the mixer 12p and an interpolation circuit 12r connected between the mixer 12p and the output terminal OUT12. The background noise generator 12q supplies a noise signal NS11 representative of the background noise to the switching circuit 12o, and the switching circuit 12o is responsive to the control signal CTL12 representative of the silence for transferring the noise signal NS11 to the mixer 12p. The mixer 12p inserts the noise signal NS11 between the voice signals VS11, and makes up the gap due to the removal of the data signal DS11 representative of user's data information.

While the mixer 12p is supplying the voice signal VS11 and the noise signal NS11 to the interpolation circuit 12r, no interpolation function is requested, and the interpolation circuit 12r transfers the voice signal VS11 and the noise signal NS11 through the output terminal OUT12 to the telephone set 12a. The telephone set 12a reproduces the talk and dummy noise. Even though the control signal CTL12 is indicative of talking, the data signal DS11 representative of the control data information is selectively steered to the output terminal OUT11, and a series of voice signals VS11 and the noise signal NS11 is intermittently interrupted through the removal of data signals DS11 representative of the control data information. For this reason, when the control signal CTL13 is indicative of the user's data information, the interpolation circuit 12r is enabled with the control signal CTL13, and supplements a dummy voice signal VS12. The dummy voice signal VS12 may be identical with the latest voice signal VS12 so as to slightly prolong the pronunciation.

Figure 6:
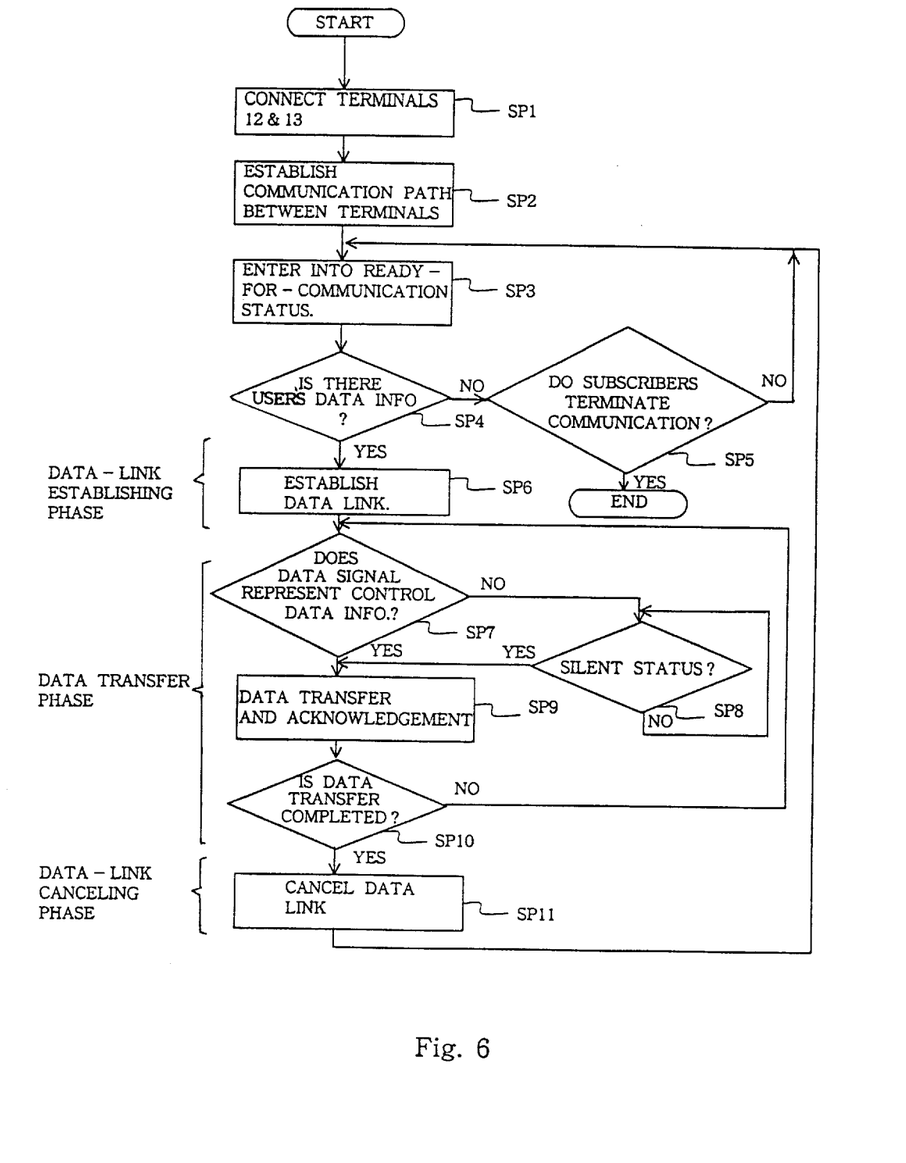
FIG. 6 is a flow chart showing a sequence of a two-way multiplex data transfer through the two-way multiplex data communication system.

FIG. 5 illustrates a sequence of multiplex data communication carried out by the two-way multiplex data communication system according to the present invention, and FIG. 6 shows a two-way multiplex data transfer between the communication terminals 12 and 13.

Referring first to FIG. 5, when the communication terminal 12 requests the exchanging station 10 to establish a communication path to the communication terminal 13, the exchanging station 10 connects the communication terminal 12 through the exchanging station 11 to the communication terminal 13 as by step SP1, and the exchanging stations 10 and 11 establish the communication path between the communication terminals 12 and 13 as by step SP2. Then, the communication terminals 12 and 13 enters into ready-for-communication status as by step SP3. I the following description, user's data information is assumed to be transferred from the communication terminal 12 to the communication terminal 13.

After the entry into the ready-for communication status, the subscribers talk to each other through the telephone sets 12a and 13a. The communication device 12c checks the data processing apparatus 12b to see whether or not there is user's data information to be transferred to the communication terminal 13 as by step SP4. While the answer at step SP4 is given negative, the data communication terminals 12 and 13 check the telephone sets 12a and 13a whether or not the subscribers terminate the communication as by step SP5. When the answers at steps SP5 and SP6 are negative, the communication terminal 12 reiterates the loop consisting of steps SP3 to SP5 until the data processing apparatus 12b requests the communication device 12c to transfer user's data information to the communication terminal 13 or the subscribers terminate the communication.

If the subscribers terminate the communication without data transfer, the answer at step SP5 is changed to affirmative, and the two-way multiple data communication system cancels the communication path.

On the other hand, when the data processing apparatus 12b requests the communication device 12c to transfer user's data information through the communication path to the data processing apparatus 13b, the answer at step SP4 is given affirmative, and the data communication terminal 12 requests the communication terminal 13 to establish a data link therebetween as by step SP6.

Figure 7:
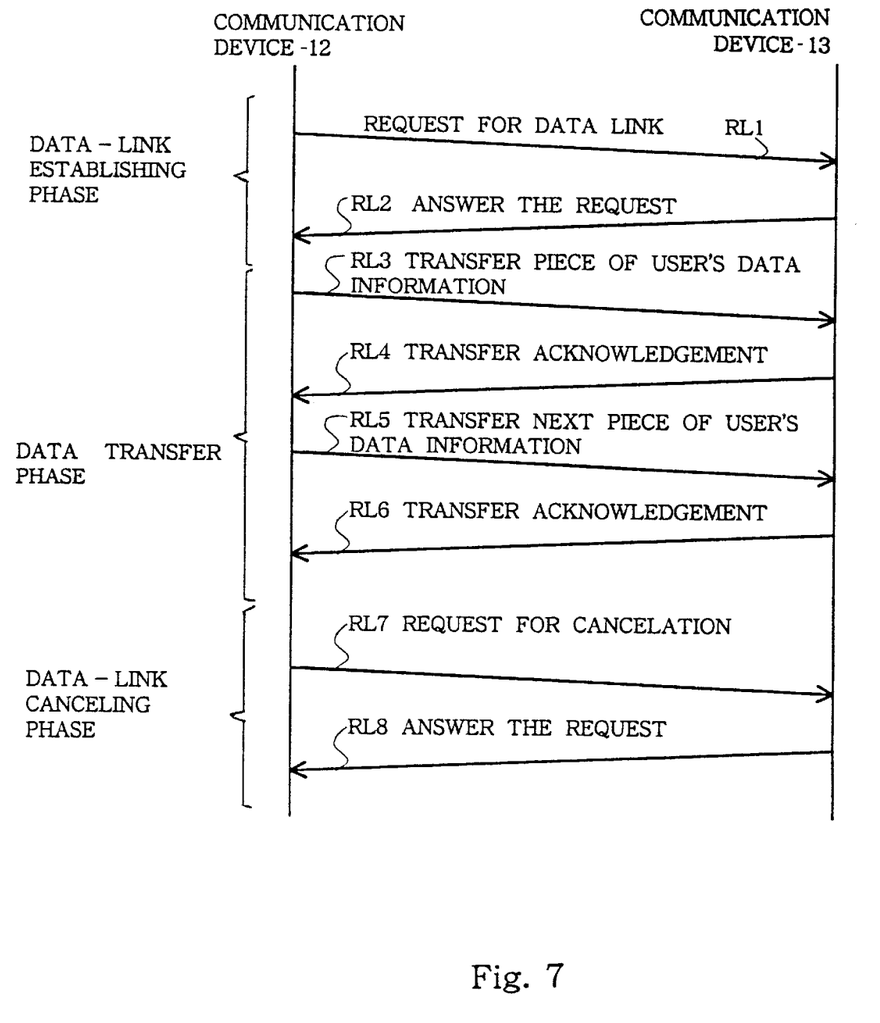
FIG. 7 is a diagram showing the two-way multiplex data transfer between communication devices.

The two-way multiplex data transfer sequence through the data link is broken down into three phases, i.e., a data link establishing phase, a data transfer phase and a data link canceling phase (see FIG. 7). First, the communication device 12c sends a request for a data link to the communication device 13c as indicated by real line RL1. If the request is acceptable, the data communication device 13 responds to the request for a data link, and answers the request as indicated by real line RL2. Then, the data link is established between communication devices 12c and 13c, and the two-way multiplex data transfer proceeds to the data transfer phase. The request for a data link and the answer are pieces of control data information, and have priority to user's data information and a piece of voice information. The multiple signals MPL10/MPL11 representative of the request and the answer are transferred between the communication devices 12c and 13d regardless of the status of the voice signals VS10 and VS11. The data link is usually established between the communication devices 12c and 13c immediately after the entry into the ready-for-communication status, and the data-link establishing phase never interrupts the talk between the subscribers.

Turning back to FIG. 6, when the data link is established between the communication devices 12c and 13c, the data communication device 12c checks the control signal CTL10 to see whether or not the data signal DS10 represents a piece of control data information as by step SP7. If the data signal DS10 represents a piece of user's data information, the answer at step SP7 is given negative, and the communication device 12c proceeds to step SP8. The data communication device 12c checks the voice signal VS10 to see whether or not the voice signal VS10 is in the silent status at step SP8. If the subscriber is talking, the answer at step SP8 is given negative, and the data communication device 12c successively transfers a series of multiple signals MPL10 representative of pieces of voice information to the data communication device 13c. For this reason, the data communication device 12c repeatedly checks the status of the voice signal VS10 for the data signal DS10.

When subscriber stops the talking, the voice signal VS10 enters into the silent status, and the answer at step SP8 is changed to affirmative. Then, the communication device 12c transfers the multiple signal MPL10 representative of a piece of user's data information to the communication device 13c, and the communication device 13c acknowledges the reception of the piece of user's data information as by step SP9.

The transmission of the piece of user's data information is represented by real line RL3 in FIG. 7. The communication device 13c extracts the piece of user's data information from the multiple signal MPL10, and transfers the data signal DS11 representative of the piece of user's data information to the data processing apparatus 13b. The data processing apparatus 13b acknowledges the piece of user's data information, and supplies the data signal DS10 representative of the acknowledgement to the data communication device 13c. The acknowledgement is a kind of control data information, and has the top priority. Therefore, the communication device 13c generates the multiple signal MPL10 representative of the acknowledgement, and transfers the multiple signal MPL10 to the data communication device 12c regardless of the status of the voice signal VS10. The transmission of the multiple signal MPL10 representative of the acknowledgement is indicated by real line RL4 in FIG. 7.

When the communication terminal 12 receives the acknowledgement, the communication terminal 12 checks the data processing apparatus 12b to see whether or not all the pieces of user's data information have been transferred to the communication terminal 13 as by step SP10.

While pieces of user's data information are left in the data processing apparatus 12b, the answer at step SP10 is given negative, and the communication terminal 12 repeats the loop consisting of steps SP8 to SP10 so as to transfer all the pieces of user's data information to the communication terminal 13. Real lines RL5 and RL6 in FIG. 7 stand for the transmission of another piece of user's data information from the communication device 12c to the communication device 13c and the transmission of the acknowledgement from the communication device 13c to the communication device 12c.

Thus, the data signal DS10 representative of the acknowledgement is immediately supplied from the communication device 13c to the communication device 12c regardless of the status of the voice signal, i.e., in the silent status or while talking. With the acknowledgement, the data processing apparatus 12b supplies the data signal DS10 representative of the next piece of user's data information to the communication device 12c, and the communication device 12c transfers the next piece of user's data information to the communication device 13c. This results in improvement in the data transmission rate.

When all the piece of user's data information are transferred to the communication terminal 13, the answer at step SP11 is changed to affirmative, and the two-way multiplex data communication system proceeds to the data-link canceling phase as by step SP11.

Upon entry into the data link canceling phase, the data processing apparatus 12b supplies the data signal DS10 representative of a request for canceling the data link to the communication device 12c. The request for canceling the data link is another kind of control data information, and the communication device 12c transfers the multiple signal MPL10 representative of the request to the communication device 13c regardless of the status of the voice signal VS10 as indicated by real line RL7 in FIG. 7.

If the request is acceptable, the data communication terminal 13 answers the request. The answer is a kind of control data information, and the communication device 13c transfers the multiple signal MPL10 representative of the answer to the communication device 12c regardless of the status of the voice signal VS10 as indicated by real line RL8. Thus, the two-way multiplex data communication system cancels the data link, and return to step SP3. The two-way multiplex data communication system reiterates the loop consisting of steps SP3 to SP11 until the subscribers terminate the communication.

Figure 8:
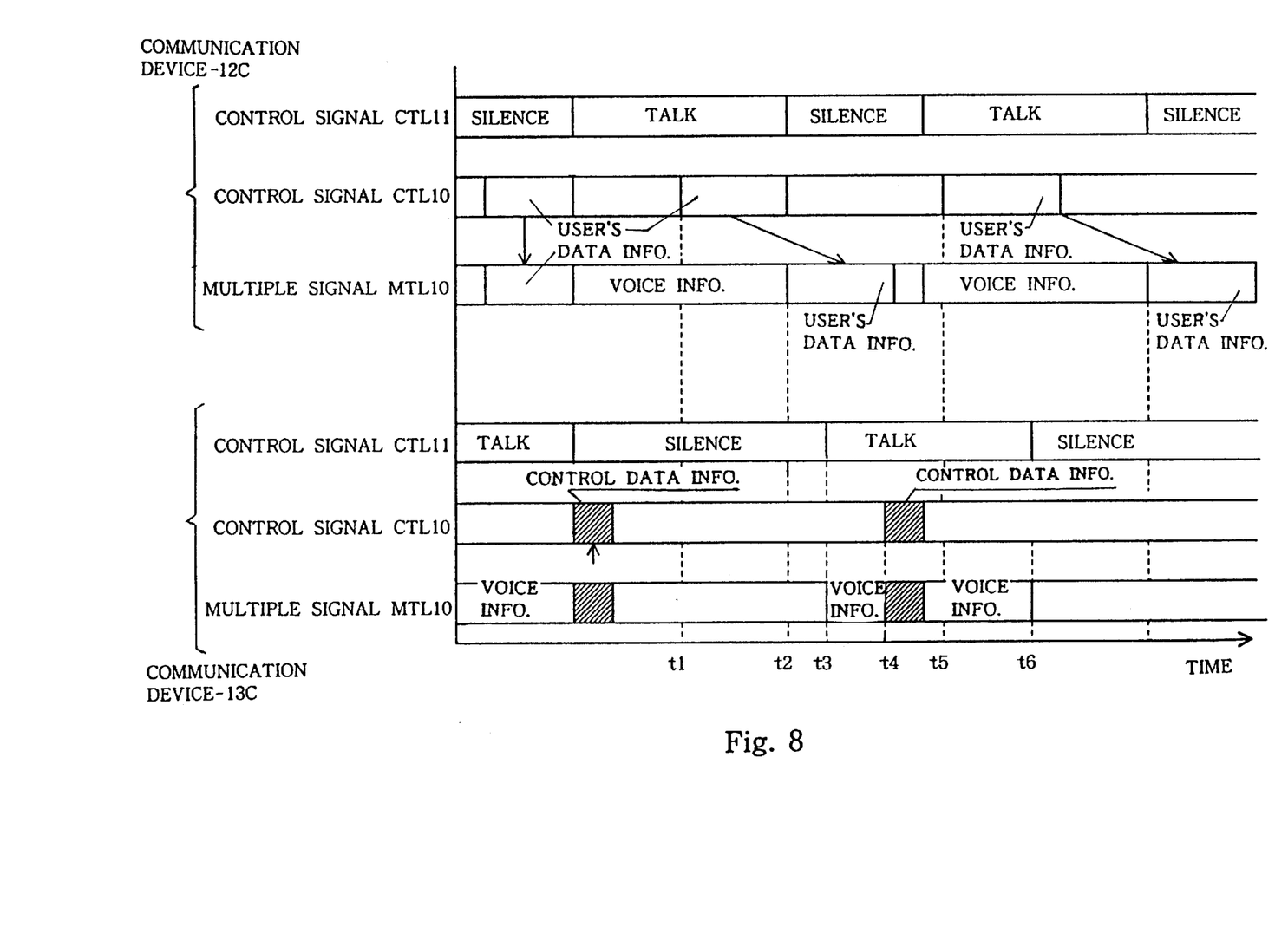
FIG. 8 is a view showing data transfer phase of the two-way multiplex data transfer at the communication devices.

FIG. 8 illustrates the data transfer phase in detail. If the data processing apparatus 12b supplies a piece of user's data information to the communication device 12c at time t1, the communication device 12c transfers the multiple signal MPL10 to the communication device 13c at time t2 when the control signal CTL11 changes the status of the voice signal VS10 to the silence. The piece of user's data information is transferred to the data processing apparatus 13b, and the data processing apparatus 13b generates the data signal DS10 representative of the acknowledgement. The data signal DS10 representative of the acknowledgement is transferred to the communication device 13c. Even if the communication device 13c is under the transmission of a piece of voice information between time t3 and time t6, the communication device 13c interrupts the transmission of the piece of voice information, and the data signal DS10 representative of the acknowledgement is transferred to the communication device 12c at time t4.

If the control data information is not prioritized, the transmission of the acknowledgement is delayed to time t6. However, the control signal CTL10 representative of the control data information forces the communication device 13c to immediately transfer the acknowledgement. As a result, the communication device 12c generates the next piece of user's data information at time t5, and the transmission of user's data information is accelerated.

As will be appreciated from the foregoing description, the two-way multiplex data communication system according to the present invention prioritizes the transmission of the control data information, and the transmission of user's data information is surely accelerated by virtue of the top priority given to the control data information.

In the above described two-way multiplex data communication system, the telephone set 12a serves as a first source of voice data information and a first reproducing means, the data processing apparatus 12b serves as a source of user's data information. A first detecting means is implemented by the detector 12h of the communication device 12c, and the switching circuits 12f and 12g, the error detecting code generator 12j and the frame generator 12i of the communication device 12c as a whole constitute a first transmitting means.

On the other hand, the telephone set 13a serves as a second source of voice data information and a second reproducing means, and the data processing apparatus 13b serves as a destination of user's data information and a source of control data information. The second transmitting means serves as a second transmitting means.

Although a particular embodiment of the present invention has been shown and described, it will be obvious to those skilled in the art that various changes and modifications may be made without departing from the spirit and scope of the present invention.

For example, a two-way multiplex data communication system according to the present invention may transfer the multiple signal through a communication satellite.

Pieces of user's data information are transmittable from the communication terminal 13 to the communication terminal 12, and the data transmitting sequence is analogous to that described hereinbefore.

The data communication device may be incorporated in one of the telephone set and the data processing apparatus.

A two-way multiplex data communication system according to the present invention may concurrently transmit multiple signals from a communication terminal to a plurality of communication terminals.

What is claimed is:

1. A two-way multiplex data communication system for transmitting pieces of voice data information, pieces of user's data information and pieces of control data information between at least two communication terminals,
   one of said at least two communication terminals comprising:
      a first source of voice data information for intermittently generating first pieces of voice data information,
      a source of user's data information for generating a piece of user's data information when said source of user's data information receives a first piece of control data information representative of a receipt of a previous piece of user's data information,
      a detecting means discriminating said first pieces of voice data information from silent status and generating a second piece of control data information representative of said silent status,
      a first transmitting means for transmitting said first pieces of voice data information to the other of said at least two communication terminals in the absence of said second piece of control data information and said piece of user's data information to said other of said at least two communication terminals in the presence of said second piece of control data information, and
      a first reproducing means for reproducing a first voice from second pieces of voice data information,
   said other of said at least two communication terminals comprising
      a second source of voice data information for intermittently generating said second pieces of voice data information,
      a second reproducing means for reproducing a second voice from said first pieces of voice data information,
      a destination of user's data information for receiving said piece of user's data information and said previous piece of user's data information,
      a source of control data information for generating said first piece of control data information when said destination receives said previous piece of user's data information, and
      a second transmitting means for preferentially transmitting said first piece of control data information to said one of said at least two communication terminals, said second transmitting means transmitting said second pieces of voice data information in the absence of said first piece of control data information.

2. The two-way multiplex data communication system as set forth in claim 1, in which said one of said at least two communication terminals further comprises said destination of user's data information, said source of control data information and said second transmitting means, and said other of said at least two communication terminals further comprises said source of user's data information, said detecting means and said first transmitting means.

3. A data communication device used in a two-way multiple data communication system, comprising:

a transmitting block including
- a first input node supplied with a first voice signal representative of a piece of voice data information and a silence,
- a second input node supplied with a first data signal representative of a piece of user's data information or a piece of control data information,
- a third input node supplied with a first control signal representing that said first data signal represents one of said piece of user's data information and said piece of said control data information,
- a detecting means monitoring said first input node for generating a second control signal when said first voice signal is representative of said piece of voice data information,
- a first switching means having a fourth input node connected to said first input node and a fifth input node connected to said second input node and transferring said voice signal to a first output node thereof in the presence of said second control signal representative of said piece of voice data information and said data signal to said first output node in the absence of said second control signal,
- a second switching means having a sixth input node connected to said second input node and a seventh input node connected to said first output node and responsive to said first control signal for transferring said voice signal and said data signal to a second output node thereof when said first control signal is representative of said piece of user's data information, said second switching means transferring said data signal representative of said piece of control data information to said second output node when said first control signal is representative of said piece of control data information, and
- a transmitting means connected at input nodes thereof to said third input node, said first and second output nodes and said detecting means and at an output node thereof to an external device and transmitting a multiple signal produced from said voice signal, said data signal, said first control signal and said second control signal to said external device.

4. The communication device as set forth in claim 3, in which said transmitting block further comprises
- an error detecting code generator connected to said transmitting means for supplying an error detecting signal used for detecting and correcting at least one error bit introduced into said multiple signal.

5. The communication device as set forth in claim 4, in which said multiple signal is formatted in such a manner as to have
- a first section assigned to a status flag representing that said voice signal is indicative of said piece of voice data information or a silence without a voice,
- a second section assigned to an informative code representing that said data signal represents said piece of user's data information or said piece of control data information,
- a third section assigned to a data information code representative of one of said piece of voice data information, said piece of user's data information and said piece of control data information, and
- a fourth section assigned to an error detecting code for correcting at least one error bit introduced into said data information code.

6. The communication device as set forth in claim 5, further comprising a receiving block including
- a decomposer for generating a second data signal from said data information code representative of another piece of user's data information or another piece of control data information, a second voice signal from said data information code representative of another piece of voice data information and a third control signal from said status flag and a fourth control signal representative of said another piece of control data information from said informative code,
- a third switching means connected to said decomposer and transferring said second data signal representative of said another piece of user's data information to a third output node when said third control signal is representative of said silence, said third switching means transferring said second voice signal and said second data signal representative of said another piece of control data information to a fourth output node when said third control signal is representative of said another piece of voice data information, and
- a fourth switching means connected to said fourth output node and transferring said voice signal to a fifth output node in the absence of said fourth control signal and said data signal representative of said another piece of control data information to said third output node in the presence of said fourth control signal.

7. The communication device as set forth in claim 6, in which said receiving block further includes
- a background noise generator for generating a noise signal representative of a background noise,
- a fifth switching means connected to said background noise generator and transferring said noise signal to a sixth output node when said third control signal is representative of said silence, and
- a mixer connected to said fifth and sixth output nodes for multiplexing said second voice signal with said noise signal.

8. The communication device as set forth in claim 6, in which said receiving block further includes
- an interpolation circuit connected to said mixer and responsive to said fourth control signal representative of said another piece of control data information for inserting a dummy voice signal a series of said second voice signal and said noise signal.

9. A two-way multiplex data communication system comprising:
- a means multiplexing a data signal representative of one of a piece of user's data information and a piece of communication controlling data information with a voice signal representative of a silence without a voice for generating a multiple signal, said piece of communication controlling data information having a priority to a piece of voice data information represented by said voice signal so as to be incorporated in said multiple signal; and
- a means introducing a piece of status data information representative of said silence and another piece of status data information representing whether said data signal represents said piece of user's data information or said piece of communication controlling data information into said multiple signal, and transmitting said multiple signal to a destination.

* * * * *